US012080101B2

(12) United States Patent
Huang et al.

(10) Patent No.: US 12,080,101 B2
(45) Date of Patent: Sep. 3, 2024

(54) SYSTEM AND METHOD OF MODE SELECTION FACE RECOGNITION WITH PARALLEL CNNS

(71) Applicant: GenkiTek Technology Co., Ltd., Taipei (TW)

(72) Inventors: Yun-Nien Huang, Taoyuan (TW); Chih-Tsung Shen, Chiayi (TW); Hsin-Jung Cheng, Kaohsiung (TW)

( * ) Notice: Subject to any disclaimer, the term of this patent is extended or adjusted under 35 U.S.C. 154(b) by 381 days.

(21) Appl. No.: 17/713,636

(22) Filed: Apr. 5, 2022

(65) Prior Publication Data

US 2023/0169792 A1 Jun. 1, 2023

(30) Foreign Application Priority Data

Nov. 26, 2021 (TW) ................................ 110144210

(51) Int. Cl.
*G06V 40/16* (2022.01)
*G06N 3/045* (2023.01)
*G06V 10/82* (2022.01)

(52) U.S. Cl.
CPC .......... *G06V 40/172* (2022.01); *G06N 3/045* (2023.01); *G06V 10/82* (2022.01); *G06V 40/168* (2022.01)

(58) Field of Classification Search
CPC .... G06V 40/172; G06V 10/82; G06V 40/168; G06V 10/454; G06V 10/764; G06N 3/045; G06N 3/08
USPC ......................................................... 382/181
See application file for complete search history.

(56) References Cited

U.S. PATENT DOCUMENTS

| 7,403,643 | B2 * | 7/2008 | Ianculescu | ....... G06V 30/19147 |
| | | | | 382/284 |
| 7,565,030 | B2 * | 7/2009 | Steinberg | ............. G06V 40/161 |
| | | | | 382/296 |
| 7,809,171 | B2 * | 10/2010 | Solinsky | ............. G06V 40/166 |
| | | | | 382/117 |
| 7,916,897 | B2 * | 3/2011 | Corcoran | ............. G06V 10/446 |
| | | | | 382/118 |

(Continued)

FOREIGN PATENT DOCUMENTS

| CA | 3044063 A1 * | 6/2018 | ......... G06K 9/00006 |
| CN | 105849747 A * | 8/2016 | ......... G06K 9/00281 |

(Continued)

*Primary Examiner* — Mahendra R Patel
(74) *Attorney, Agent, or Firm* — Clement Cheng (57) ABSTRACT

A system and method of mode selection face recognition with parallel CNNs are disclosed. The system includes a mode selection module, a parallel convolutional neural network module, a database module and an ID judgment module. The parallel convolutional neural network module includes several convolutional neural network units. The mode selection module can determine the facial characteristics of each facial image, and send each facial image to the convolutional nerve corresponding to its facial characteristics The results serve as a benchmark for the ID judgment module to compare and test other facial images. By using several convolutional neural network units for facial image training for different facial characteristics of the same person, the noise from other convolutional neural network units can be reduced and the similarity in the feature vector extraction stage can be improved. The resulting accuracy of face recognition will increase.

10 Claims, 5 Drawing Sheets

(56) References Cited

U.S. PATENT DOCUMENTS

| | | | | |
|---|---|---|---|---|
| 8,046,313 | B2 * | 10/2011 | Hoffberg | H04N 21/252 |
| | | | | 706/14 |
| 8,989,453 | B2 * | 3/2015 | Steinberg | H04N 23/84 |
| | | | | 382/162 |
| 10,361,802 | B1 * | 7/2019 | Hoffberg-Borghesani | ........ |
| | | | | G06F 3/00 |
| 11,854,247 | B2 * | 12/2023 | Zhang | G06V 10/764 |
| 2008/0279425 | A1 * | 11/2008 | Tang | G06V 40/16 |
| | | | | 382/118 |

FOREIGN PATENT DOCUMENTS

| | | | | | |
|---|---|---|---|---|---|
| CN | 106951867 | A | * | 7/2017 | G06K 9/00228 |
| CN | 107871103 | A | * | 4/2018 | G06K 9/00221 |
| CN | 108009528 | A | * | 5/2018 | G06K 9/00288 |
| CN | 108509920 | A | * | 9/2018 | G06K 9/00268 |
| CN | 108573211 | A | * | 9/2018 | G06K 9/00268 |
| CN | 109117817 | A | * | 1/2019 | G06K 9/00268 |
| CN | 109376596 | A | * | 2/2019 | G06K 9/00268 |
| CN | 107194341 | B | * | 4/2020 | G06K 9/00228 |
| CN | 112308158 | A | * | 2/2021 | G06F 18/213 |
| CN | 109165566 | B | * | 4/2021 | G06K 9/00268 |
| CN | 113192596 | A | * | 7/2021 | G06F 21/32 |
| CN | 109635643 | B | * | 10/2023 | G06F 18/2148 |

\* cited by examiner

|  | Content Element | Distance From The Test Feature Vector | Voting ID |
|---|---|---|---|
| first test feature vector 121A | [1, 0, 1, 1, 0, 0, 0, 1] | -- | 00001 |
| first feature vector 1211 | [1, 0, 1, 0, 0, 0, 0, 1] | 1 | |
| first feature vector 1212 | [0, 0, 0, 1, 0, 1, 0, 1] | 3 | |
| ⋮ | ⋮ | ⋮ | |
| third test feature vector 123A | [1, 1, 0, 0, 1, 0, 1, 0] | -- | 00008 |
| third feature vector 1231 | [1, 0, 1, 0, 0, 1, 1, 0] | 4 | |
| third feature vector 1232 | [1, 1, 0, 1, 1, 1, 1, 1] | 3 | |
| ⋮ | ⋮ | ⋮ | |
| fifth test feature vector 125A | [0, 0, 0, 0, 1, 1, 1, 0] | -- | 00001 |
| fifth feature vector 1211 | [1, 0, 0, 0, 1, 1, 1, 1] | 2 | |
| ⋮ | ⋮ | ⋮ | |

Fig. 4 building a parallel convolutional neural network module, comprising a plurality of convolutional neural network unit, each convolutional neural network unit extracts a feature vector from at least one received facial image for a facial characteristic and binds the feature vector to a specific ID (S01)

in a learning stage, for each specific person having a corresponding ID, determining the facial characteristic of at least one facial image of the specific person received transmitted externally and inputting the at least one facial image to the associated at least one of the convolutional neural network units according to the facial characteristic, respectively, by a mode selection module to build the extracted feature vectors and bound ID in a database module (S02)

in a testing stage, determining the facial characteristic of a test facial image, and transmitting the test facial image to at least one convolutional neural network unit corresponding to the facial characteristic thereof by the mode selection module, and executing the following tasks by the ID judgment module:
a. receiving at least one test feature vector extracted by at least one convolutional neural network unit associated with a test facial image, and comparing the at least one test feature vector with the feature vectors extracted by the corresponding convolutional neural network unit stored in the database module;
b. selecting the bound ID of one feature vector closest to the at least one test feature vector as a voting ID; and
c. calculating a number of times being selected for each voting ID and finding the one with the largest number of times being selected. (S03)

Fig. 5

SYSTEM AND METHOD OF MODE SELECTION FACE RECOGNITION WITH PARALLEL CNNS

FIELD OF THE INVENTION

The present invention relates to a system and a method of face recognition. More particularly, the present invention relates to a method and a system of mode selection face recognition with parallel convolutional neural networks (CNN).

BACKGROUND OF THE INVENTION

In the process of interpersonal communication, the basic judgment of mutual understanding and interaction is based on the person's appearance and personality traits. As far as face recognition is concerned, the human brain has a complex neural network. After being trained from an early age, when a certain age is reached, it is very easy to judge different people by face. Therefore, this ability is used by humans to handle some tasks, such as security guards or access control management.

Modeled on human talents, machine learning has also extended from pure image learning to face recognition and applied to automatic management. CNN is a deep learning algorithm commonly used in image recognition. Although the complete algorithm of CNN has not been proposed for a long time, due to its good results, many research and development results have been invested, and the applications are wide. Generally, the operation of convolutional neural network in face recognition is to learn a large number of facial images first, and then recognize and distinguish different people. After receiving a new facial image, it is able to use the existing learning data to distinguish whether the person on the facial image has been known by the CNN through learning, and then achieve the purpose of face recognition. However, due to differences in head orientation, posture, age, facial expressions, hair color, background, and accessories in the facial image, even for the facial images of the same person, large data sets used for learning will also lead to huge different results between images. Therefore, even in the feature extraction stage for the same person in the CNN system, there are huge differences in the extracted feature vectors, which makes it difficult for the feature vector matching stage to function, and the effect that the CNN can produce is also limited.

If the facial image training data set of the same person is pre-classified into different subgroups with similar settings, the noise from other subgroups can be reduced and the similarity in the feature vector extraction stage can be improved. When all subgroups point to the same person, the accuracy of the resulting face recognition effect will increase. However, there are no associated technical teachings in the prior arts.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requirement mentioned above, a system of mode selection face recognition with parallel CNNs, installed and operated in a calculator. It comprises: a parallel convolutional neural network module, comprising a plurality of convolutional neural network units, each convolutional neural network unit extracts a feature vector from at least one received facial image for a facial characteristic and binds the feature vector to a specific ID; a mode selection module, receiving a plurality of facial images transmitted externally, determining the facial characteristic of each facial image, and transmitting each facial image to at least one convolutional neural network unit corresponding to the facial characteristic thereof; a database module, storing extracted feature vectors and bound IDs according to different convolutional neural network unit; and an ID judgment module, executing the following tasks in a testing stage: a. receiving at least one test feature vector extracted by at least one convolutional neural network unit associated with a test facial image, and comparing the at least one test feature vector with the feature vectors extracted by the corresponding convolutional neural network unit stored in the database module; b. selecting the bound ID of one feature vector closest to the at least one test feature vector as a voting ID; and c. calculating a number of times being selected for each voting ID and finding the one with the largest number of times being selected. In a learning stage, the mode selection module, for each specific person having a corresponding ID, inputs at least one facial image of the specific person to the associated at least one convolutional neural network unit according to the facial characteristic, respectively, to build the content of the database module.

A method of mode selection face recognition with parallel CNNs is also disclosed. It is applied to a calculator and comprises steps: building a parallel convolutional neural network module, comprising a plurality of convolutional neural network unit, each convolutional neural network unit extracts a feature vector from at least one received facial image for a facial characteristic and binds the feature vector to a specific ID; in a learning stage, for each specific person having a corresponding ID, determining the facial characteristic of at least one facial image of the specific person received transmitted externally and inputting the at least one facial image to the associated at least one of the convolutional neural network units according to the facial characteristic, respectively, by a mode selection module to build the extracted feature vectors and bound ID in a database module; and in a testing stage, determining the facial characteristic of a test facial image, and transmitting the test facial image to at least one convolutional neural network unit corresponding to the facial characteristic thereof by the mode selection module, and executing the following tasks by the ID judgment module: a. receiving at least one test feature vector extracted by at least one convolutional neural network unit associated with a test facial image, and comparing the at least one test feature vector with the feature vectors extracted by the corresponding convolutional neural network unit stored in the database module; b. selecting the bound ID of one feature vector closest to the at least one test feature vector as a voting ID; and c. calculating a number of times being selected for each voting ID and finding the one with the largest number of times being selected.

According to the present invention, the facial characteristic may be front view of the face, left view of the face, right view of the face, lower part of the face gender or age group.

In an embodiment, the mode selection module may further adjust weight values of each associated convolutional neural network unit for the received test facial image, so that the ID judgment module uses the weight values to adjust a weight of each voting ID, respectively, making the voting ID from the associated convolutional neural network unit not valued 1 when being selected.

In another embodiment, if elements in any one of all feature vectors extracted by one convolutional neural network unit and stored in the database module are different from corresponding elements in test feature vector, or a distance therebetween is higher than a default value, the ID judgment module determines that no voting ID comes from that convolutional neural network unit.

Preferably, the facial image may be an image file, a frame of the image portion of a video file, a frame of a streaming video, or a partially captured image of any of the foregoing.

By using several convolutional neural network units for facial image training for different facial characteristics of the same person, the noise from other convolutional neural network units can be reduced and the similarity in the feature vector extraction stage can be improved. The resulting accuracy of face recognition will increase.

DETAILED DESCRIPTION OF THE PREFERRED EMBODIMENTS

The present invention will now be described more specifically with reference to the following embodiments.

Figure 1:
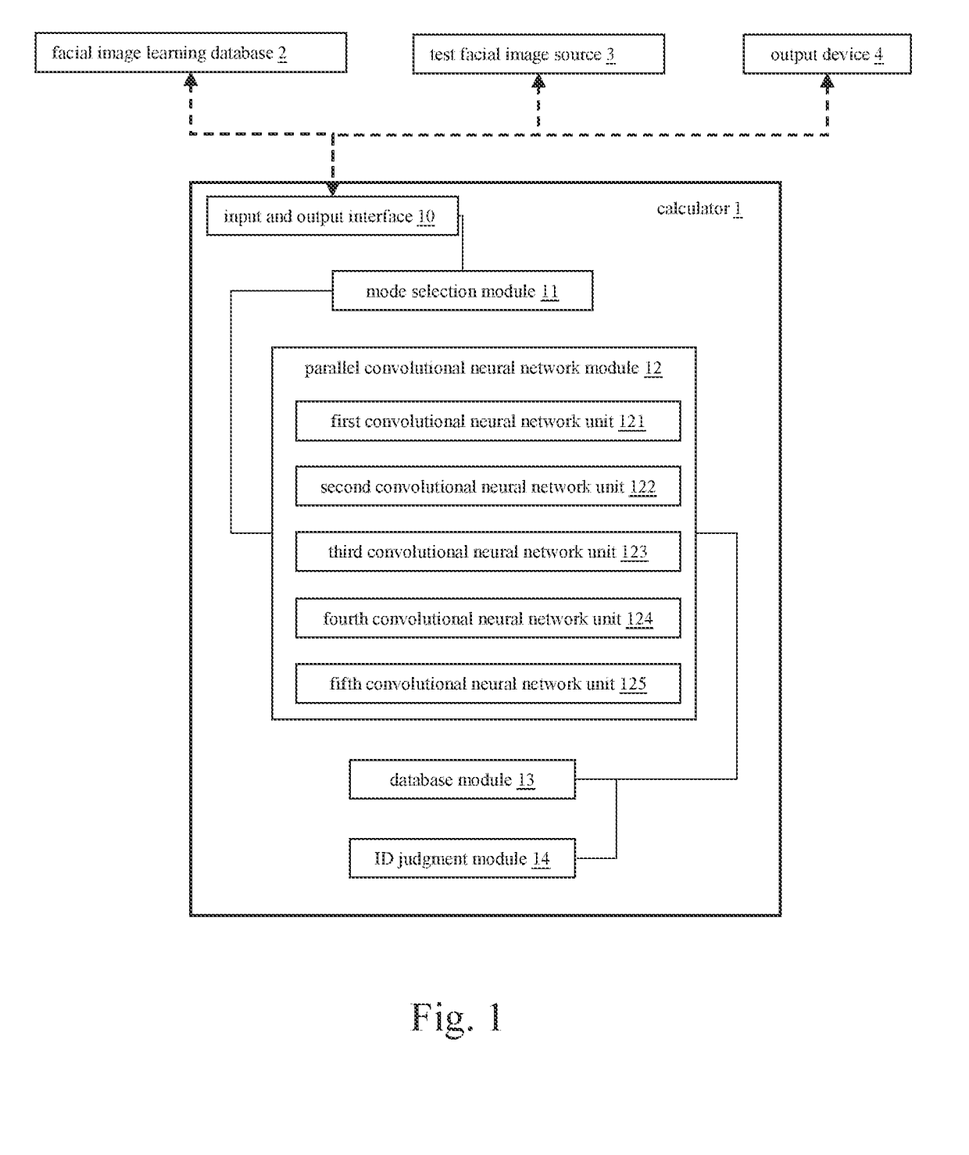
FIG. 1 is an element diagram of a system of mode selection face recognition with parallel CNNs according to an embodiment of the present invention.

Please see FIG. 1. It is an element diagram of a system of mode selection face recognition with parallel CNNs (hereinafter referred to as the system) according to an embodiment of the present invention. The system can be installed in a calculator 1 to operate with the hardware architecture of the calculator 1. The calculator 1 where the system is installed may be, but is not limited to a server, industrial computer, desktop computer or notebook computer. Its hardware architecture may include central processing unit, memory, storage device (such as hard disk), I/O unit, etc., but it is better to have more memory, for example 32G. Meanwhile, the central processing unit should be capable of multi-tasking and parallel processing, and the processing speed is fast. Although the hardware is not shown in FIG. 1, it is an architecture that should be understood by those skilled in the computer field. In addition, one of the important hardware in the calculator 1 is an input and output interface 1, which is the assembly of important software and hardware that connects the calculator 1 and external hardware through a network or a data bus. It may include hardware such as network card, connection cable, wireless communication module, etc. The various modules of the present invention introduced in the following are technical elements operated by utilizing or cooperating with the devices of the above calculator 1. Therefore, they may be software, containing specific codes and data, and run in at least one part of the hardware architecture under the operating system. For example, codes and related data files are stored in the storage device, temporarily stored in the memory under the operation of the operating system, and are dynamically called and executed by the central processing unit. On the other hand, the modules can also be special hardware, such as Application-Specific Integrated Circuit (ASIC) or external cards, to perform the functions assigned by the modules. What's more, these technical elements may be part of software and part of hardware, and they can be effectively integrated according to the needs of product designers. These are all within the scope of the technology claimed by this patent.

The system includes a mode selection module 11, a parallel convolutional neural network module 12, a database module 13 and an ID judgment module 14. First, the parallel convolutional neural network module 12 is introduced. The parallel convolutional neural network module 12 includes several convolutional neural network units that operate independently of each other. Just like a general convolutional neural network architecture, each convolutional neural network unit has at least one convolutional layer to extract image features. After the dimensionality reduction of the rectified linear unit layer and the pooling layer, the result of learning or testing is output through the fully connected layer. One feature of the present invention is that each convolutional neural network unit is for facial characteristics to process learning and facial image, respectively. The parallel convolutional neural network module 12 is not a parallel computing structure that deals with the same feature facial image. Here, the facial characteristic refers to different categories of facial images that the convolutional neural network unit to learn. It is based on the orientation of the image taken and the characteristics of the face. According to the present invention, the facial characteristic may be front view of the face, left view of the face, right view of the face, lower part of the face, gender or age group. Not all facial characteristics must be applied to the system. What is generally required is front view of the face, left view of the face and right view of the face. Each convolutional neural network unit can extract a feature vector from at least one received facial image for facial characteristic no matter it is under learning or testing, and bind the feature vector to a specific ID. It should be emphasized that each convolutional neural network unit can process extraction of feature vector for a single facial image (for learning or testing), it can also extract feature vectors from a number of facial images of the same person (usually for learning). Binding the feature vector to the specific ID is used for output of the learning results, and the specific ID belongs to a specific person. Namely, after learning all the facial images of a facial characteristic of a specific person by each convolutional neural network unit, the only feature vector obtained will be bound to the ID owned by the specific person. In the present embodiment, the parallel convolutional neural network module 12 includes 5 convolutional neural network units: a first convolutional neural network unit 121 dealing with front facial images, a second convolutional neural network unit 122 dealing with right side facial images, a third convolutional neural network unit 123 dealing with left side facial images, a fourth convolutional neural network unit 124 dealing with facial images in teenager, a fifth convolutional neural network unit 125 dealing facial images having man characteristics. Operation of the parallel convolutional neural network module 12 will be explained in detail later.

The mode selection module 11 is a selector, capable of receiving a number of facial images transmitted externally, e.g., from a facial image learning database 2, and determining the facial characteristic of each facial image. Namely, the mode selection module 11 determines which facial characteristic (front view of the face, left view of the face, etc.) is for each facial image, and transmits each facial image to at least one convolutional neural network unit which is corresponding to the facial characteristic of the facial image. In more detail, each facial image does not necessarily have only one facial characteristic. For example, a 45-degree front photo may also be a 45-degree left photo. Thus, the file of the photo can be input into the first convolutional neural network unit 121 and the third convolutional neural network unit 123 at the same time for learning or testing. It should be noticed that, regardless of file format, the facial image input to the convolutional neural network unit may be a color image, grayscale image, and even sketch image, as long as the facial image can represent a specific person and present the facial features of the specific person, so that ordinary people can recognize the specific person from the facial image at a glance.

The database module 13 is a technical element used by the system to store learning results. The database module 13 can store extracted feature vectors and bound ID 14 according to different convolutional neural network unit.

Figure 2:
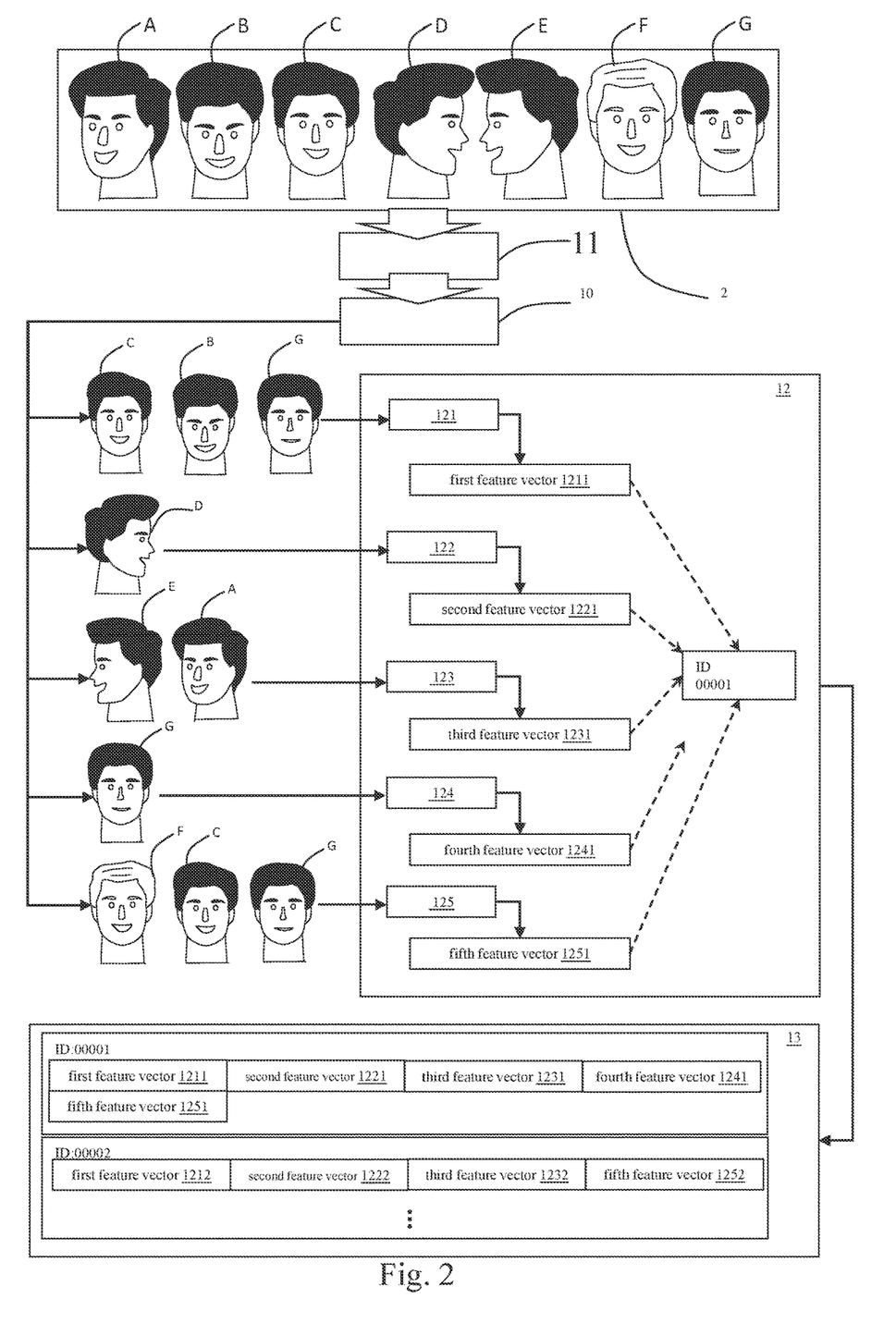
FIG. 2 shows an operating mode of the system of mode selection face recognition with parallel CNNs in a learning stage.

Regarding the operation of the system, it is divided into a learning stage and a testing stage. They separately learn multiple facial images of multiple people, and determine whether the subsequent input test facial image belongs to a person corresponding to a certain ID in database module 13 according to the learning results. Corresponding. For the operation of the learning stage, please refer to FIG. 2. It shows an operating mode of the system in a learning stage. In short, in the learning stage, the mode selection module 11, for each specific person having a corresponding ID, inputs at least one facial image of the specific person to the associated at least one convolutional neural network unit according to the facial characteristic, respectively, to build the content of the database module 13. As shown in FIG. 2, many facial images of a number of people are provided in the facial image learning database 2. n practice, it can also be a collection of photos, stored in a storage device, but classified according to different people. Take Bob as an example. The database module 13 has his 45-degree front photo A, front head-down photo B, front view photo C, right side photo D, left side photo E, front dyeing-hair photo F and youth front view photo G. The mode selection module 11 classifies these photos according to the facial characteristic, and inputs the 45-degree front photo A to the third convolutional neural network unit 123, inputs the front head-down photo B to the first convolutional neural network unit 121, inputs the front view photo C to the first convolutional neural network unit 121 and the fifth convolutional neural network unit 125, inputs the right side photo D to the second convolutional neural network unit 122, inputs the left side photo E to the third convolutional neural network unit 123, inputs the front dyeing-hair photo F to the fifth convolutional neural network unit 125, and inputs the youth front view photo G to the first convolutional neural network unit 121, the fourth convolutional neural network unit 124 and the fifth convolutional neural network unit 125. 5 convolutional neural network units learn according to the input data, and output the learning results as a first feature vector 1211, a second feature vector 1221, a third feature vector 1231, a fourth feature vector 1241, and a fifth feature vector 1251. According to the present invention, the feature vector can be of any type. It may be a series of binary, octal, decimal, or hexadecimal numbers representing characteristics, and the number varies according to the degree of accuracy. In the present embodiment, please see FIG. 4 which shows the process of calculating voting ID. To simplify the description, each feature vector is represented by 8-bit 0 and 1. The aforementioned 5 feature vectors are respectively bound to Bob's ID, 00001. Next, the parallel convolutional neural network module 12 builds the feature vectors extracted from the learning results and the bound ID in the database module 13. Then, the system continues to learn the facial images of others in the learning stage. However, not every ID is bound to all 5 respective feature vectors. Take ID 00002 as an example. The person corresponding to the ID did not provide a teenage facial image for learning. Therefore. ID 00002 only has bound first feature vector 1212, second feature vector 1222, third feature vector 1232 and fifth feature vector 1252. The learning results can be applied to the entry and exit control of personnel with access control.

Figure 3:
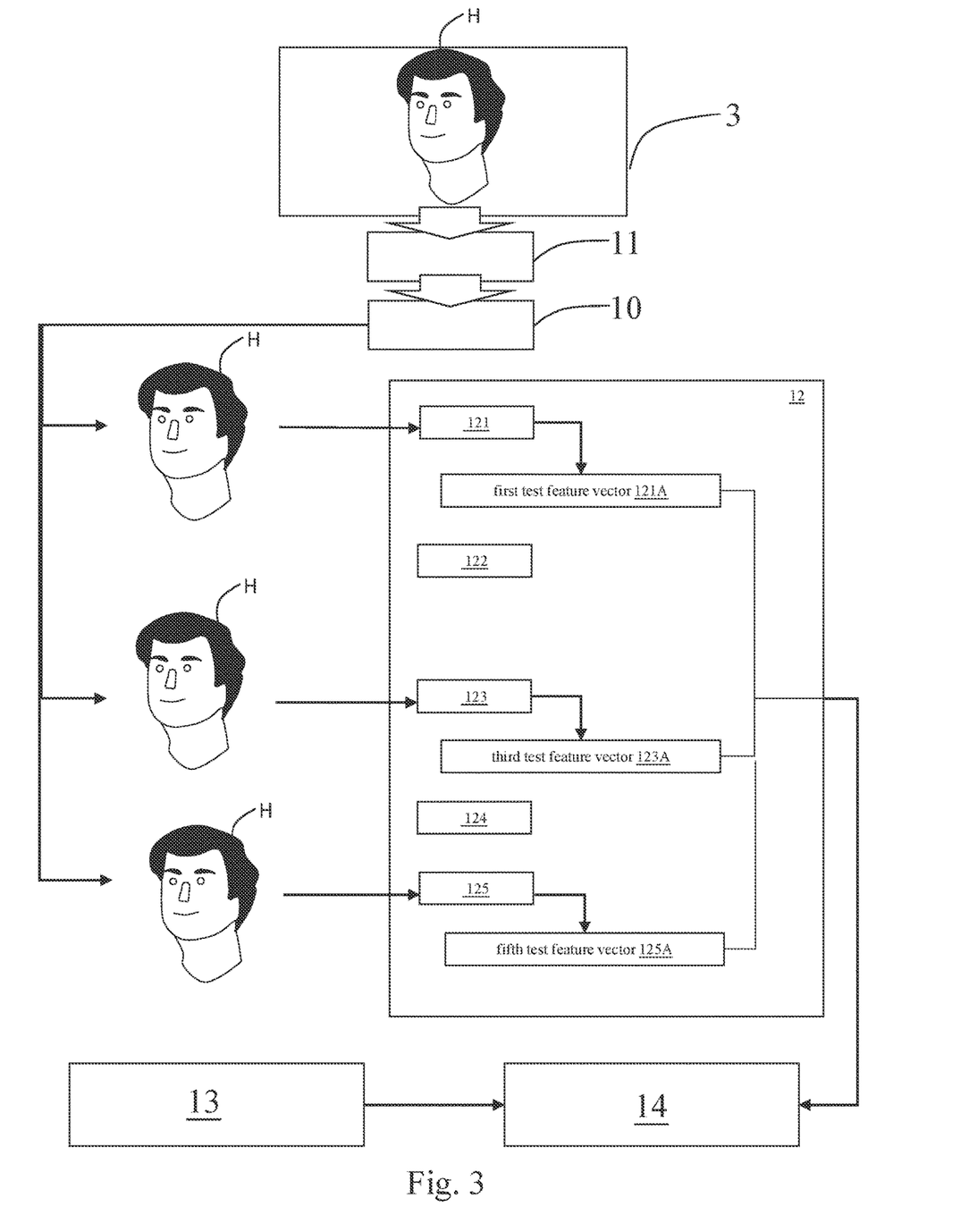
FIG. 3 shows an operating mode of the system of mode selection face recognition with parallel CNNs in a testing stage.
Figure 4:
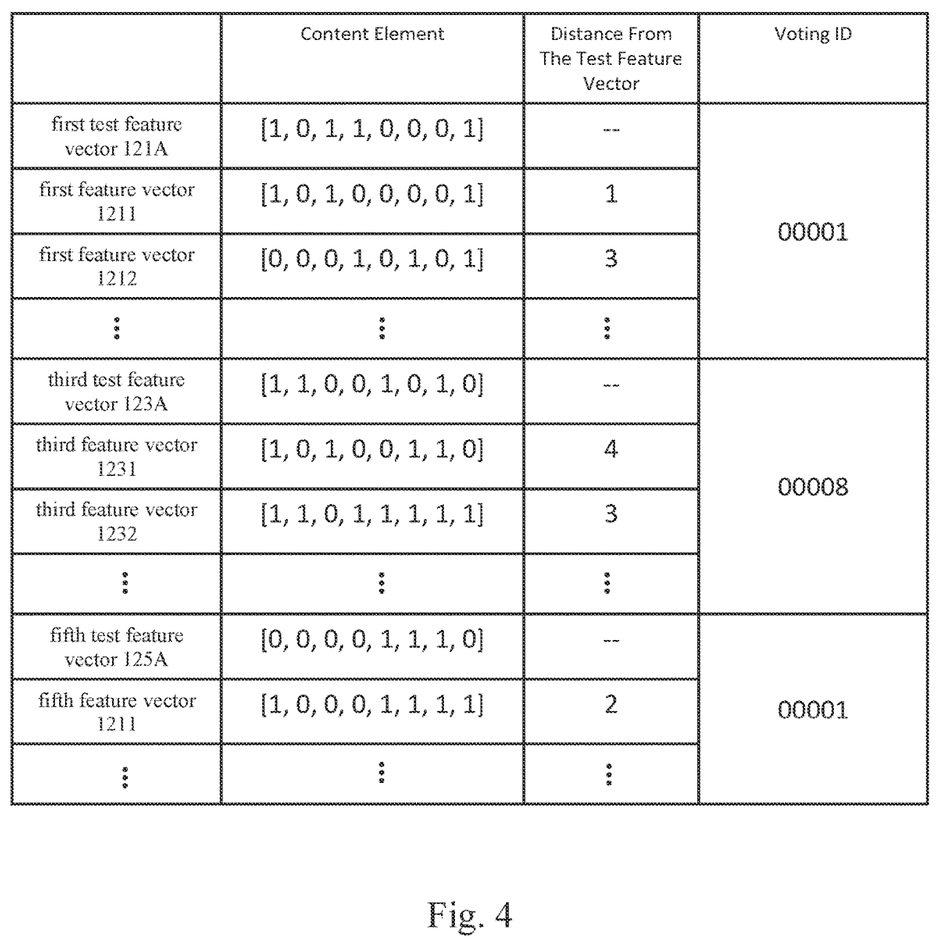
FIG. 4 shows the process of calculating voting ID.

For the operation of the testing stage of the system, please refer to FIG. 3. It shows an operating mode of the system in a testing stage. In testing stage, a test facial image source 3 out of the system, such as a streaming monitoring video equipment of a monitor, transmits a test facial image H. The test facial image H will be determined by the system whether it belongs to a specific person whose ID is in the database module 13. This task is first started by the mode selection module 11: determining the facial characteristic of the test facial image H, and transmitting the test facial image H transmit to at least one convolutional neural network unit which is corresponding to the facial characteristic of the test facial image H. In this embodiment, the test facial image H is a 15-degree front head-up image. It is selected by the mode selection module 11 to input to the first convolutional neural network unit 121, the third convolutional neural network unit 123 and the fifth convolutional neural network unit 125. Next, according to the test facial image H, the aforementioned 3 convolutional neural network units respectively calculated the first test feature vector 121A, the third test feature vector 123A, and the fifth test feature vector 125A. Then, the ID judgment module 14 executes the following tasks. Task a: receiving at least one test feature vector extracted by at least one convolutional neural network unit associated with the test facial image H, and comparing the at least one test feature vector with the feature vectors extracted by the corresponding convolutional neural network unit stored in the database module 13. For the description of this step, please refer to FIG. 4 again. FIG. 4 uses a tabular method to illustrate the process of calculating voting ID. It shows how feature vectors are compared. In FIG. 4, the first test feature vector 121A is [1, 0, 1, 1, 0, 0, 0, 1]. It will be compared with all associated first feature vectors 1211, 1212 . . . etc. one by one. Similarly, the third test feature vector 123A and the fifth test feature vector 125A will do the same thing respectively. Task b: selecting the bound ID of one feature vector closest to the at least one test feature vector as a voting ID. According to the present invention, the closeness between two feature vectors can be expressed by the distance between the two. In the present embodiment, the distance is represented by the difference between corresponding content elements of the two feature vector. For example, the first test feature vector 121A is different from the first feature vector 1211 at the 4th bit, so the distance is 1; The fifth test feature vector 125A and fifth feature vector 1211 are different in the first and eighth bits, and the distance is 2. However, because the representation for the feature vector can use other methods, the distance can also use the Euclidean distance in multi-dimensional space. According to the results in FIG. 4, the ID judgment module 14 judges that the first test feature vector 121A is closest to the first feature vector 1211, and selects the ID 00001 as the voting ID; the third test feature vector 123A is closest to a third feature vector (not shown in the table in FIG. 4), the ID 00008 bound to the third feature vector is selected as the voting ID; the fifth test feature vector 125A is closest to fifth feature vector 1251, and ID 00001 is selected as the voting ID. Last, task c: calculating a number of times being selected for each voting ID and finding the one with the largest number of times being selected. It can be seen from FIG. 4 that ID 00001 is used as voting ID twice, more than ID 00008. Therefore, the test facial image H belongs to the person represented by ID 00001. The test results of the system can be output to an output device 4, such as a liquid crystal screen, through the input and output interface 10. If the system is applied to access control management, the person is accepted by the system and can be released.

The above example shows that the operation result of each convolutional neural network unit is equivalent, so their voting IDs are also equivalent. However in some applications, for example, some people like to put on makeup in daily life, therefore, the accuracy of the calculation results of the test facial image obtained will be different in different convolutional neural network units. Hence, different weight values can be given to the voting ID of different convolutional neural network units to solve this problem. The more precise the voting ID of the convolutional neural network unit is, the higher the weight value is given. According to the present invention, the mode selection module 11 may further adjust weight values of each associated convolutional neural network unit for the received test facial image, so that the ID judgment module 14 uses the weight values to adjust a weight of each voting ID, respectively, making the voting ID from the associated convolutional neural network unit not valued 1 when being selected. Take FIG. 4 for illustration. If weight value of 0.8 is given to the voting ID of the first convolutional neural network unit 121, weight value of 1.5 is given to the voting ID of the third convolutional neural network unit 123, and weight value of 0.6 is given to the voting ID of the fifth convolutional neural network unit 125, then the number of calculations of DI 00001 as voting ID has become 1.4, and the number of calculations of DI 00008 as voting ID has become 1.5. The result of judgment is that the test facial image H belongs to the person represented by ID 00008.

In addition, the operation result of each convolutional neural network unit is not necessarily calculated as a voting. This is because the content elements of the two feature vectors compared are different from each other, or the difference between them exceeds a preset tolerance range, which is easy to cause misjudgment. That is, in a group of dissimilar facial images, force to find the closest one. The processing method of the system can be that if elements in any one of all feature vectors extracted by one convolutional neural network unit and stored in the database module 13 are different from corresponding elements in test feature vector, or a distance therebetween is higher than a default value, the ID judgment module 14 determines that no voting ID comes from that convolutional neural network unit.

It should be noted that the facial image, including test facial image, mentioned in the present invention in type may be an image file, a frame of the image portion of a video file, a frame of a streaming video, or a partially captured image of any of the foregoing.

Figure 5:
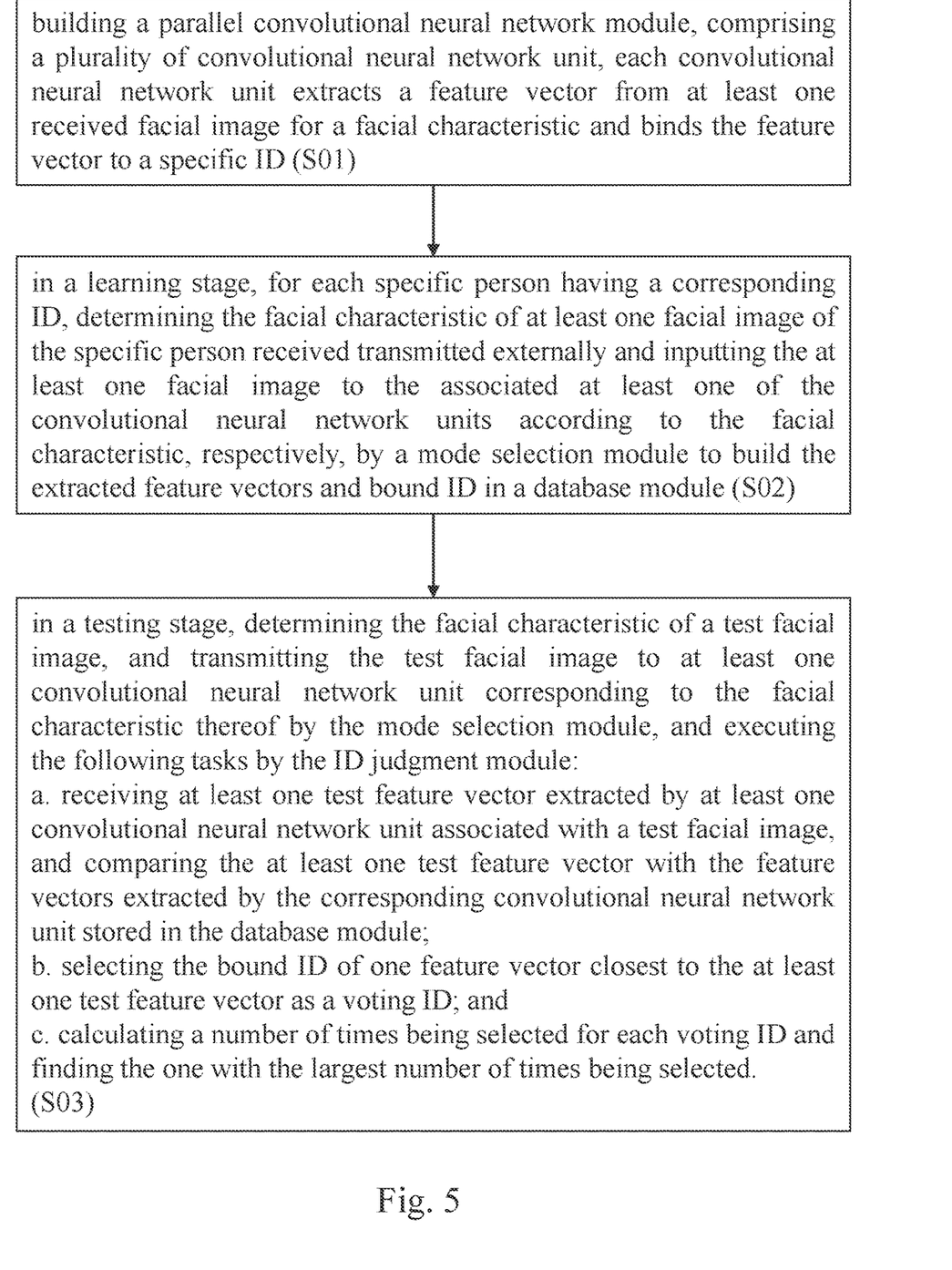
FIG. 5 is a flow chart of a method of mode selection face recognition with parallel CNNs according to an embodiment of the present invention.

From the foregoing description of the system, a method of mode selection face recognition with parallel CNNs (hereinafter referred to as the method) can be derived. The method can be applied to a calculator. Please see FIG. 5. FIG. 5 is a flow chart of the method. It can be seen from the flow chart that the method comprises steps: building a parallel convolutional neural network module, comprising a plurality of convolutional neural network unit, each convolutional neural network unit extracts a feature vector from at least one received facial image for a facial characteristic and binds the feature vector to a specific ID; in a learning stage, for each specific person having a corresponding ID, determining the facial characteristic of at least one facial image of the specific person received transmitted externally and inputting the at least one facial image to the associated at least one of the convolutional neural network units according to the facial characteristic, respectively, by a mode selection module to build the extracted feature vectors and bound ID in a database module; and in a testing stage, determining the facial characteristic of a test facial image, and transmitting the test facial image to at least one convolutional neural network unit corresponding to the facial characteristic thereof by the mode selection module, and executing the following tasks by the ID judgment module: a. receiving at least one test feature vector extracted by at least one convolutional neural network unit associated with a test facial image, and comparing the at least one test feature vector with the feature vectors extracted by the corresponding convolutional neural network unit stored in the database module; b. selecting the bound ID of one feature vector closest to the at least one test feature vector as a voting ID; and c. calculating a number of times being selected for each voting ID and finding the one with the largest number of times being selected.

As disclosed in the system, the facial characteristic may be front view of the face, left view of the face, right view of the face, lower part of the face, gender or age group. The mode selection module may further adjust weight values of each associated convolutional neural network unit for the received test facial image, so that the ID judgment module uses the weight values to adjust a weight of each voting ID, respectively, making the voting ID from the associated convolutional neural network unit not valued 1 when being selected. If elements in any one of all feature vectors extracted by one convolutional neural network unit and stored in the database module are different from corresponding elements in test feature vector, or a distance therebetween is higher than a default value, the ID judgment module determines that no voting ID comes from that convolutional neural network unit. The facial image may be an image file, a frame of the image portion of a video file, a frame of a streaming video, or a partially captured image of any of the foregoing.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A system of mode selection face recognition with parallel CNNs, installed and operated in a calculator, comprising:
   a parallel convolutional neural network module, comprising a plurality of convolutional neural network units, each convolutional neural network unit extracts a feature vector from at least one received facial image for a facial characteristic and binds the feature vector to a specific ID;

a mode selection module, receiving a plurality of facial images transmitted externally, determining the facial characteristic of each facial image, and transmitting each facial image to at least one convolutional neural network unit corresponding to the facial characteristic thereof;

a database module, storing extracted feature vectors and bound IDs according to different convolutional neural network unit; and an ID judgment module, executing the following tasks in a testing stage:
   a. receiving at least one test feature vector extracted by at least one convolutional neural network unit associated with a test facial image, and comparing the at least one test feature vector with the feature vectors extracted by the corresponding convolutional neural network unit stored in the database module;
   b. selecting the bound ID of one feature vector closest to the at least one test feature vector as a voting ID; and
   c. calculating a number of times being selected for each voting ID and finding the one with the largest number of times being selected, wherein, in a learning stage, the mode selection module, for each specific person having a corresponding ID, inputs at least one facial image of the specific person to the associated at least one convolutional neural network unit according to the facial characteristic, respectively, to build the content of the database module.

2. The system of mode selection face recognition with parallel CNNs according to claim 1, wherein the facial characteristic is front view of the face, left view of the face, right view of the face, lower part of the face, gender or age group.

3. The system of mode selection face recognition with parallel CNNs according to claim 1, wherein the mode selection module further adjusts weight values of each associated convolutional neural network unit for the received test facial image, so that the ID judgment module uses the weight values to adjust a weight of each voting ID, respectively, making the voting ID from the associated convolutional neural network unit not valued 1 when being selected.

4. The system of mode selection face recognition with parallel CNNs according to claim 1, wherein if elements in any one of all feature vectors extracted by one convolutional neural network unit and stored in the database module are different from corresponding elements in test feature vector, or a distance therebetween is higher than a default value, the ID judgment module determines that no voting ID comes from that convolutional neural network unit.

5. The system of mode selection face recognition with parallel CNNs according to claim 1, wherein the facial image is an image file, a frame of the image portion of a video file, a frame of a streaming video, or a partially captured image of any of the foregoing.

6. A method of mode selection face recognition with parallel CNNs, applied to a calculator, comprising steps:
   building a parallel convolutional neural network module, comprising a plurality of convolutional neural network unit, each convolutional neural network unit extracts a feature vector from at least one received facial image for a facial characteristic and binds the feature vector to a specific ID;
   in a learning stage, for each specific person having a corresponding ID, determining the facial characteristic of at least one facial image of the specific person received transmitted externally and inputting the at least one facial image to the associated at least one of the convolutional neural network units according to the facial characteristic, respectively, by a mode selection module to build the extracted feature vectors and bound ID in a database module; and
   in a testing stage, determining the facial characteristic of a test facial image, and transmitting the test facial image to at least one convolutional neural network unit corresponding to the facial characteristic thereof by the mode selection module, and executing the following tasks by the ID judgment module:
      a. receiving at least one test feature vector extracted by at least one convolutional neural network unit associated with a test facial image, and comparing the at least one test feature vector with the feature vectors extracted by the corresponding convolutional neural network unit stored in the database module;
      b. selecting the bound ID of one feature vector closest to the at least one test feature vector as a voting ID; and
      c. calculating a number of times being selected for each voting ID and finding the one with the largest number of times being selected.

7. The method of mode selection face recognition with parallel CNNs according to claim 6, wherein the facial characteristic is front view of the face, left view of the face, right view of the face, lower part of the face, gender or age group.

8. The method of mode selection face recognition with parallel CNNs according to claim 6, wherein the mode selection module further adjusts weight values of each associated convolutional neural network unit for the received test facial image, so that the ID judgment module uses the weight values to adjust a weight of each voting ID, respectively, making the voting ID from the associated convolutional neural network unit not valued 1 when being selected.

9. The method of mode selection face recognition with parallel CNNs according to claim 6, wherein if elements in any one of all feature vectors extracted by one convolutional neural network unit and stored in the database module are different from corresponding elements in test feature vector, or a distance therebetween is higher than a default value, the ID judgment module determines that no voting ID comes from that convolutional neural network unit.

10. The method of mode selection face recognition with parallel CNNs according to claim 6, wherein the facial image is an image file, a frame of the image portion of a video file, a frame of a streaming video, or a partially captured image of any of the foregoing.

* * * * *